R. W. SWIFT.
ALTERNATING CURRENT SYNCHRONOUS MOTOR.
APPLICATION FILED DEC. 4, 1914.
1,226,406.
Patented May 15, 1917.
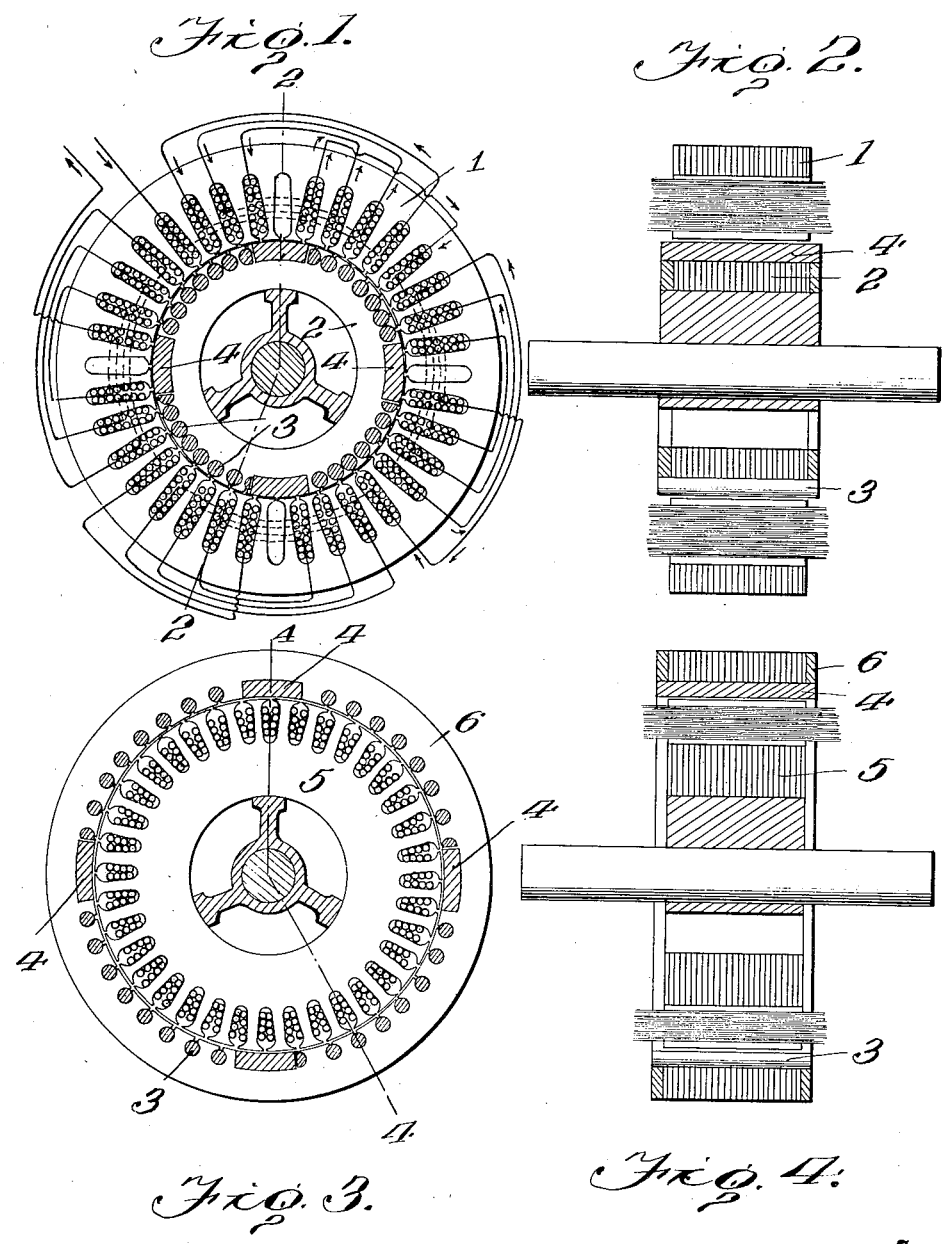

UNITED STATES PATENT OFFICE.

ROBERT W. SWIFT, OF WARREN, OHIO, ASSIGNOR TO THE PEERLESS ELECTRIC COMPANY, OF WARREN, OHIO, A CORPORATION OF OHIO.

ALTERNATING-CURRENT SYNCHRONOUS MOTOR.

1,226,406.  Specification of Letters Patent.  Patented May 15, 1917.

Application filed December 4, 1914. Serial No. 875,448.

*To all whom it may concern:*

Be it known that I, ROBERT W. SWIFT, of Warren, in the county of Trumbull and State of Ohio, have invented certain new and useful Improvements in Alternating-Current Synchronous Motors; and I do hereby declare the following to be a full, clear, and exact description of the invention, such as will enable others skilled in the art to which it appertains to make and use the same.

The primary object of this invention is to provide an improved induction motor for single or polyphase circuits equipped with means for causing the rotor to operate in exact synchronism with the alternations of the current and to avoid lagging or slippage of the rotor relative to the pulsations of the current.

I provide on the rotor or secondary member two short circuited conducting paths for the induced current. These may be of the same or different conductivities. One is symmetrical with the polar field and the other unsymmetrical with relation to the polar field.

In the accompanying drawing, Figure 1 is a section of an alternating current motor equipped with my improvement. Fig. 2 is a section on line 2—2, Fig. 1. Fig. 3 is a view similar to Fig. 1 but showing an alternative arrangement. Fig. 4 is a section on line 4—4, Fig. 3.

Referring to the drawings, 1 designates the stator or inducing member which may be either of solid iron or built up of soft iron disks and shown formed with slots wherein are inserted an even number of polar or field windings constituting a distributed wound field circuit.

In Figs. 1 and 2 I have shown the rotor or secondary member 2 provided at its periphery with four series of groups or sections composed of current conducting members forming two electrical paths, one of which preferably has a greater conductivity than the other, although the conductivities may be the same. The conductors forming one path, preferably the greater, are located symmetrically in relation to the polar field of the stator, while the conductors forming the other or lesser path are of themselves unsymmetrical in relation to such field. I have shown the conductors of the unsymmetrical or lesser path consisting of an odd or uneven number of plugs 3, preferably of copper, extending through the rotor at its periphery. They are separated by the four relatively large copper bars 4 constituting the symmetrical or greater path. The surface or periphery of the rotor is interrupted at the points of location of the bars 4 to provide seats or recesses for the bars.

As a result of the described arrangement the number of plugs 3 is prime to the stator pole number and provides a conducting path unsymmetrical relative to the stator poles. The four bars 4, however, are equally spaced about the periphery of the rotor and are of corresponding sizes and therefore in exact diametrical arrangement. In so arranging the bars it is immaterial whether they cut into the plugs 3 or not. As shown they do cut into some of the plugs. The essential fact, in either event, is that the plugs are split up into four equally spaced parts. Hence each of these groups, considered as an entirety, that is a series of plugs with its bar 4, is in symmetrical relation to the poles of the stator. The plugs themselves, however, individually and collectively considered, are not symmetrical to the poles of the stator.

As shown, the solid bars have a combined cross sectional area greater than the combined cross sectional area of the copper plugs. Hence, after the plugs have effected the starting, the bars, by their greater conductivity, produce a current greater than the plugs, thus overcoming the tendency of the rotor to lag relative to the pulsations of the current.

The copper bars are united electrically to the copper plugs, thereby constituting an integral solid structure with two electrical paths. The bars may be soldered or welded at their ends to the plugs. The rotor may be composed of an iron core with the plugs and bars tightly inserted and so arranged and united by soldering or welding as to constitute a substantially integral solid structure and form the desired number of closed circuits.

As shown in Figs. 2 and 4 the described arrangement may be reversed, that is to say, the rotor 5 may contain the polar field and the stator 6 may be equipped with the groups or sections of plugs and intermediate bars.

The advantages of my invention will be readily appreciated by those skilled in the art, and it will be seen that by means thereof the synchronism of an alternating current motor is insured, and that the same results may be obtained by constructing either the rotor or the stator in accordance with my invention.

I claim as my invention:

1. In an induction motor, in combination, a stator and a rotor, one member having a polar field and the other an electrical path which is symmetrical with said field and a path which is unsymmetrical with said field.

2. In an induction motor, in combination, a stator and a rotor, one member having means for producing a given number of poles therein, and the other member having a number of conductors prime to said pole number, connected to provide a conducting path unsymmetrical to said poles, and also provided with an electrically conducting path symmetric thereto.

3. In an induction motor, in combination, a stator and a rotor, one member having an even number of polar windings and the other an odd or uneven number of plugs, a plurality of bars dividing said plugs, said plugs and bars forming two electrical paths one of which is symmetrical with said windings and the other unsymmetrical with said windings.

4. In an induction motor, in combination, a stator and a rotor, one member having an even number of polar windings and the other an odd or uneven number of plugs, a plurality of bars dividing said plugs, said plugs and bars forming two electrical paths, the conductivity of said bars being greater than that of said plugs.

5. In an induction motor, in combination, a stator having an even number of polar windings and a rotor having an odd or uneven number of plugs unsymmetrical with relation to said polar windings, and a plurality of bars equally spaced and separating said plugs into series, said bars being in symmetrical relation to said windings.

6. In an induction motor, in combination, a stator having polar windings and a rotor having plugs at its periphery unsymmetrical with relation to said windings, bars separating said plugs and symmetrical with said windings, said bars dividing said plugs into groups or sections of which the respective bars form parts, said groups or sections being symmetrical with said windings.

In testimony whereof, I have signed this specification in the presence of two subscribing witnesses.

ROBERT W. SWIFT.

Witnesses:
M. E. RIDER,
W. C. WARD.